United States Patent [19]
Miyashita et al.

[11] Patent Number: 5,731,097
[45] Date of Patent: Mar. 24, 1998

[54] SOLID-ELECTROLYTE FUEL CELL

[75] Inventors: Tomofumi Miyashita; Satoru Seike; Chieko Imazawa, all of Tokyo; Hisashi Suwahara, Noda; Masanori Haba, Kashiwa, all of Japan

[73] Assignee: Kabushiki Kaisha Meidensha, Tokyo, Japan

[21] Appl. No.: 716,712

[22] Filed: Sep. 12, 1996

[30] Foreign Application Priority Data

| Sep. 13, 1995 | [JP] | Japan | 7-234545 |
| Feb. 16, 1996 | [JP] | Japan | 8-028790 |
| Aug. 5, 1996 | [JP] | Japan | 8-205140 |

[51] Int. Cl.$^6$ ................................................ H01M 8/10
[52] U.S. Cl. ........................... 429/30; 429/33; 429/193
[58] Field of Search .......................... 429/33, 30, 191, 429/192, 193; 204/421

[56] References Cited

U.S. PATENT DOCUMENTS

| 5,171,645 | 12/1992 | Khandkar | 429/33 |
| 5,232,794 | 8/1993 | Krumpelt et al. | 429/30 |
| 5,364,506 | 11/1994 | Gür et al. | 204/59 R |
| 5,409,785 | 4/1995 | Nakano et al. | 429/33 |
| 5,472,799 | 12/1995 | Watanabe | 429/30 |
| 5,478,444 | 12/1995 | Liu et al. | 204/59 R |
| 5,500,292 | 3/1996 | Muranaka et al. | 429/33 X |

FOREIGN PATENT DOCUMENTS

| 0 275 356 | 7/1988 | European Pat. Off. . |
| 0 726 609 | 8/1996 | European Pat. Off. . |
| 43 07 727 | 9/1994 | Germany . |
| WO 92/15122 | 9/1992 | WIPO . |

OTHER PUBLICATIONS

I. Riess, "Theoretical Treatment of Transport Equations for Electrons and Ions in a Mixed Conductor", J. Electrochem. Soc.: Electrochemical Science and Technology, vol. 128, No. 10, Oct. 1981, pp. 2077–2081.

I. Riess, "The Possible Use of Mixed Ionic Electronic Conductors Instead of Electrolytes in Fuel Cells", Solid State Ionics, 52 (1992); pp. 127–134. (No Month).

I. Riess, "Current–Voltage Relation and Charge Distribution in Mixed Ionic Electronic Solid Conductors", Phys. Chem. Solids, vol. 47, No. 2, 1986, pp.129–138. (No Month).

Chemical Abstracts, vol. 123, No. 12, Sep. 18, 1995; abstract No. 148979; and JP-A-06 349 503, published Dec. 22, 1994.

Chemical Abstracts, vol. 122, No. 24, Jun. 12, 1995; abstract No. 295367; and JP-A-07 057 747, published Mar. 3, 1995. Patent Abstracts of Japan, vol. 16, No. 453, Sep. 21, 1992; and JP-A-4 160759, published Jun. 4, 1992.

Steele, "Oxygen Transport And Exchange In Oxide Ceramics", Journal of Power Souces, vol. 49, No. 1/03, published Apr. 1, 1994, pp. 1–14.

Chen, "Synthesis And Characterization Of $(CeO_2)_{0.8}(SmO_{1.5})_{0.2}$ Thin Films From Polymeric Precursors", Journal Of The Electrochemical Society, vol. 140, No. 12, published Dec. 1, 1993; pp. 3555–3560.

*Primary Examiner*—Anthony Skapars
*Attorney, Agent, or Firm*—Foley & Lardner

[57] ABSTRACT

The invention relates to a solid-electrolyte fuel cell including an anode that is intended to be in contact with a fuel; a cathode that is intended to be in contact with an oxidant for oxidizing the fuel; and a first oxygen-ion-conductive (electrolyte) film and a second oxygen-ion conductive film that are stuck together, are connected with the anode and the cathode, and are arranged in descending order toward the anode, by activation energy of oxygen ion. According to the fuel cell, it becomes possible to increase the open-circuit voltage.

25 Claims, 15 Drawing Sheets

◫ :Ba

⊙ :Y

● :Cu

○ :Ba   ◐ :Ce   ● :O

● :Zr(Ce)   ○ :O

NiO

SOLID-ELECTROLYTE FUEL CELL

BACKGROUND OF THE INVENTION

The present invention relates to a fuel cell having a solid electrolyte that has the ability to conduct a current by the passage of ions through the crystal lattice of the electrolyte.

In FIG. 22, there is shown a conventional solid-electrolyte fuel cell 10. As is seen from FIG. 22, this cell 10 has a solid electrolyte 12 that is oxygen-ion conductive. There are formed a porous cathode 14 (oxygen electrode) made of a material such as perovskite and a porous anode 16 (hydrogen electrode) made of a material such as a cermet of Ni and yttrium-stabilized zirconia (hereinafter also referred to as YSZ), on both sides of the solid electrolyte 12. When an oxidant (i.e., oxygen gas or air) is introduced into an oxidant supply chamber 18 on the cathode side, oxygen molecules are turned into oxygen ions ($O^{2-}$) by a catalyst 20 on the cathode, as shown in the following reaction formula (1):

$$1/2 O_2 + 2e^- \longrightarrow O^{2-} \tag{1}$$

The thus formed oxygen ions ($O^{2-}$) diffuse through the solid electrolyte 12 that is oxygen-ion conductive and reach the anode 16. On the other hand, a fuel gas such as hydrogen gas (see FIG. 22) or natural gas is introduced into a fuel-gas supply chamber 22 on the anode side. The oxygen ions that have been transported from the cathode 14 react with the fuel gas by a catalyst 24 on the anode 16, as shown in the following reaction formula (2), thereby to produce steam (see FIG. 22) or carbon dioxide to be removed from the cell 10.

$$H_2 + O^{2-} \rightarrow H_2O + 2e^- \tag{2}$$

The solid electrolyte 12 is made of a material that is high in oxygen ion conductivity, but is low in electronic conductivity. There is provided a load 26 between the cathode 14 and the anode 16.

There are many solid electrolytes made of stabilized zirconia in the form of solid solution prepared by doping zirconia with an oxide of yttrium or another element. When such solid electrolytes are employed in fuel cells, the operation temperature of fuel cell becomes necessarily very high (e.g., about 1,000° C.). Thus, there are proposals to lower the cell operation temperature. For example, there is a proposal to use materials such as $CeO_2$, $Bi_2O_3$ and the like for solid electrolyte, in order to lower the operation temperature of fuel cell to a temperature of about 700°–800° C. Solid electrolytes made of such materials have a problem that the electrolyte is reduced in a reducing atmosphere such as fuel (hydrogen) gas atmosphere, but has an advantage that the fuel cell operation temperature can be lowered, as compared with that of YSZ. Therefore, there have recently been used $CeO_2$-based solid electrolytes as an alternative to YSZ-based electrolytes.

In general, as the electric current generated from fuel cell is increased, there increases a problem that the terminal voltage (output voltage) of fuel cell becomes lower than its electromotive force, due to voltage drop caused by the internal resistance of fuel cell. Fuel cell has two types of such internal resistance. The first type is bulk resistances of electrodes and electrolyte. These bulk resistances lower the terminal voltage in proportion to the electric current from fuel cell. In other words, suppose that a fuel cell has an internal bulk resistance R in total, and that the electric current I is generated from the fuel cell, the terminal voltage becomes lower than the electromotive force by an amount of RI. Of conventional solid electrolytes, it is said that a $CeO_2$-based electrolyte doped with Sm, which is represented by a formula of $(CeO_2)_x(Sm_2O_3)_{1-x}$ where x is a real number that is greater than 0 and less than 1, has the smallest resistance against the oxygen ion movement therethrough. Hereinafter, this Sm-doped $CeO_2$-based electrolyte will be abbreviated to SDC, too.

The second type of the internal resistance is a surface resistance between electrode and electrolyte. This surface resistance causes overvoltage that is found by the following Tafel's equation (3)

$$\eta = A + B \cdot \ln(I) \tag{3}$$

where $\eta$ is overvoltage, A and B are constants, and I is electric current. Within an electric current range that is normally used in fuel cell, the overvoltage value does not change so much, as compared with the electric current's change. Therefore, the surface resistance is often expressed by a unit of volt (V), instead of a unit of resistance ($\Omega$).

Although fuel cell has the above-mentioned problem caused by its internal resistance, $CeO_2$-based electrolytes have characteristics superior to those of the above-mentioned YSZ-based electrolytes, as follows. Firstly, $CeO_2$-based electrolytes have oxygen ion conductivities that are considerably higher than those of YSZ-based electrolytes. In general, the oxygen ion conductivity of electrolyte decreases exponentially, as the operation temperature of fuel cell is lowered. However, even if the operation temperature of a fuel cell having a $CeO_2$-based electrolyte is lowered to 800° C., the oxygen ion conductivity of this electrolyte is maintained at about 0.1 S/cm which is comparable to that of a YSZ-based electrolyte that is operated at 1,000° C. Secondly, $CeO_2$-based electrolytes have overvoltages that are smaller than YSZ-based electrolytes. In other words, the former has a considerably smaller terminal voltage drop caused by overvoltage, as compared with that of the latter.

$CeO_2$-based electrolytes have a problem of open-circuit voltage's drop caused by the reduction of $CeO_2$ into $Ce_2O_3$ which is semiconducting. For example, under a condition that a hydrogen gas of atmospheric pressure containing 3% of steam and an oxygen gas of atmospheric pressure are respectively introduced at 800° C. into the fuel-gas supply chamber and into the oxidant supply chamber, the open-circuit voltage of YSZ-based electrolyte becomes 1.15 V which is the same as the theoretical value. In contrast, under this condition, the open-circuit voltage of $CeO_2$-based electrolyte becomes only about 0.8 V.

SUMMARY OF THE INVENTION

It is therefore an object of the present invention to provide a solid-electrolyte fuel cell that is high in open-circuit voltage and superior in durability.

It is a more specific object of the present invention to provide a fuel cell having a $CeO_2$-based electrolyte that is high in open-circuit voltage.

According to the present invention, there is provided a solid-electrolyte fuel cell comprising: an anode that is intended to be in contact with a fuel; and a cathode that is intended to be in contact with an oxidant for oxidizing said fuel.

According to a first aspect of the present invention, the solid-electrolyte fuel cell further comprises: first and second oxygen-ion-conductive films that are stuck together, are connected with said anode and said cathode, and are arranged in descending order toward said anode, by activation energy of oxygen ion. The first film is in contact with said cathodes and is low in electronic conductivity so as to prevent a short-circuit electronic current therein.

According to a second aspect of the present invention, the solid-electrolyte fuel cell further comprises: at least one electrolyte film is oxygen ion conductive and is made of a first material containing as an essential component $CeO_2$; and at least one oxygen-ion-conductive film, said at least one electrolyte film and said at least one oxygen-ion-conductive film being stuck together, being connected with said anode and said cathode, and being arranged in descending order toward said anode, by activation energy of oxygen ion.

According to the first and second aspects of the present invention, it becomes possible to increase the open-circuit voltage of fuel cell and to decrease polarization resistance at the interface between the oxygen-ion-conductive films or between the electrolyte film and the oxygen-ion-conductive film.

According to a third aspect of the present invention, the solid-electrolyte fuel cell further comprises: a first electrolyte film that is oxygen-ion conductive and is interposed between and connected with said anode and said cathode, and a second film that is interposed between and connected with said first electrolyte film and said anode, is electronically conductive and oxygen-ion conductive, and has an activation energy of oxygen ion of not greater than 0.68 eV, preferably not greater than 0.5 eV.

According to a fourth aspect of the present invention, the solid-electrolyte fuel cell further comprises: a first electrolyte film that is oxygen-ion conductive and is interposed between and connected with said anode and said cathode; and a second oxide film which is interposed between and connected with said first electrolyte film and said anode, contains at least one of $CeO_2$ and $ZrO_2$, and has a perovskite structure having oxygen vacancy defects such that said second oxide film is made oxygen-ion conductive.

According to the third and fourth aspects of the present invention, the first electrolyte film is preferably made of a first material containing as an essential component $CeO_2$. That is, the first electrolyte film is preferably made of a $CeO_2$-based material.

According to the third aspect of the present invention, the second film is preferably made of a second material which contains Cu and has a perovskite structure and oxygen vacancy defects such as that said second film is made oxygen-ion conductive.

According to a fifth aspect of the present invention, the solid-electrolyte fuel cell further comprises: a first electrolyte film that is oxygen-ion conductive, is interposed between and connected with said anode and said cathode, and is made of a first material containing as an essential component $CeO_2$; and a second oxide film which is interposed between and connected with said first electrolyte film and said anode, and has a perovskite structure having oxygen vacancy defects such that said second oxide film is made oxygen-ion conductive, said second oxide film being prepared by diffusing at least one member selected from the group consisting of Ba, Sr and Ca, into a surface layer of said first electrolyte film.

DESCRIPTION OF THE PREFERRED EMBODIMENTS

CONVENTIONAL TRANSPORT MODEL

Figure 1:
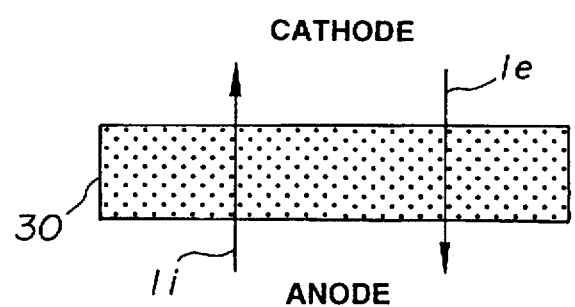
FIG. 1 is a schematic view showing a flow of electronic current (Ie) and a flow of oxygen ion current (Ii), through electrolyte, in accordance with conventional transport model.

A phenomenon of the lowering of open-circuit voltage of a $CeO_2$-based electrolyte has usually been explained by a conventional theory of "transport model". According to an Israeli called Riess (see I. Reiss, J. Electrochem. Soc. (1981) Vol. 128, No. 10, pp. 2077–2081), this transport model is a theory that the open-circuit voltage of fuel cell is lowered by the generation of short-circuit electronic current. According to this model, $CeO_2$ (hereinafter also referred to ceria) used as an essential base material of electrolyte is deteriorated during the use of fuel cell, causing the increase of electronic conductivity of fuel cell electrolyte, and thereby the short-circuit electronic current is generated in the fuel cell. According to the transport model, the real open-circuit voltage (Voc) is found by the following equation (4).

$$Voc = Vth - Ri \cdot Ii \tag{4}$$

where Vth is theoretical open-circuit voltage, Ri is electrolyte's ceria resistance against oxygen ion movement therethrough, and Ii is the value of oxygen ion current through the electrolyte when the external circuit is open. As is seen from FIG. 1, according to the transport model, even when the external circuit of fuel cell having a ceria-based electrolyte 30 is open, there are electronic current (Ie) from cathode to anode and oxygen ion current (Ii) from anode to cathode. These currents flow through the electrolyte 30 in the opposite directions, as illustrated, and have the same current value.

Figure 2:
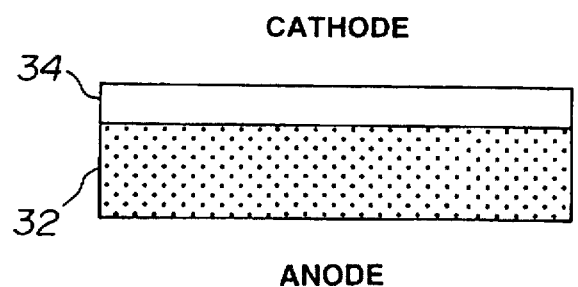
FIG. 2 is a schematic view showing a fuel cell having a dense yttrium-stabilized zirconia (YSZ) film 34 which is sandwiched between cathode and electrolyte film.
Figure 3:
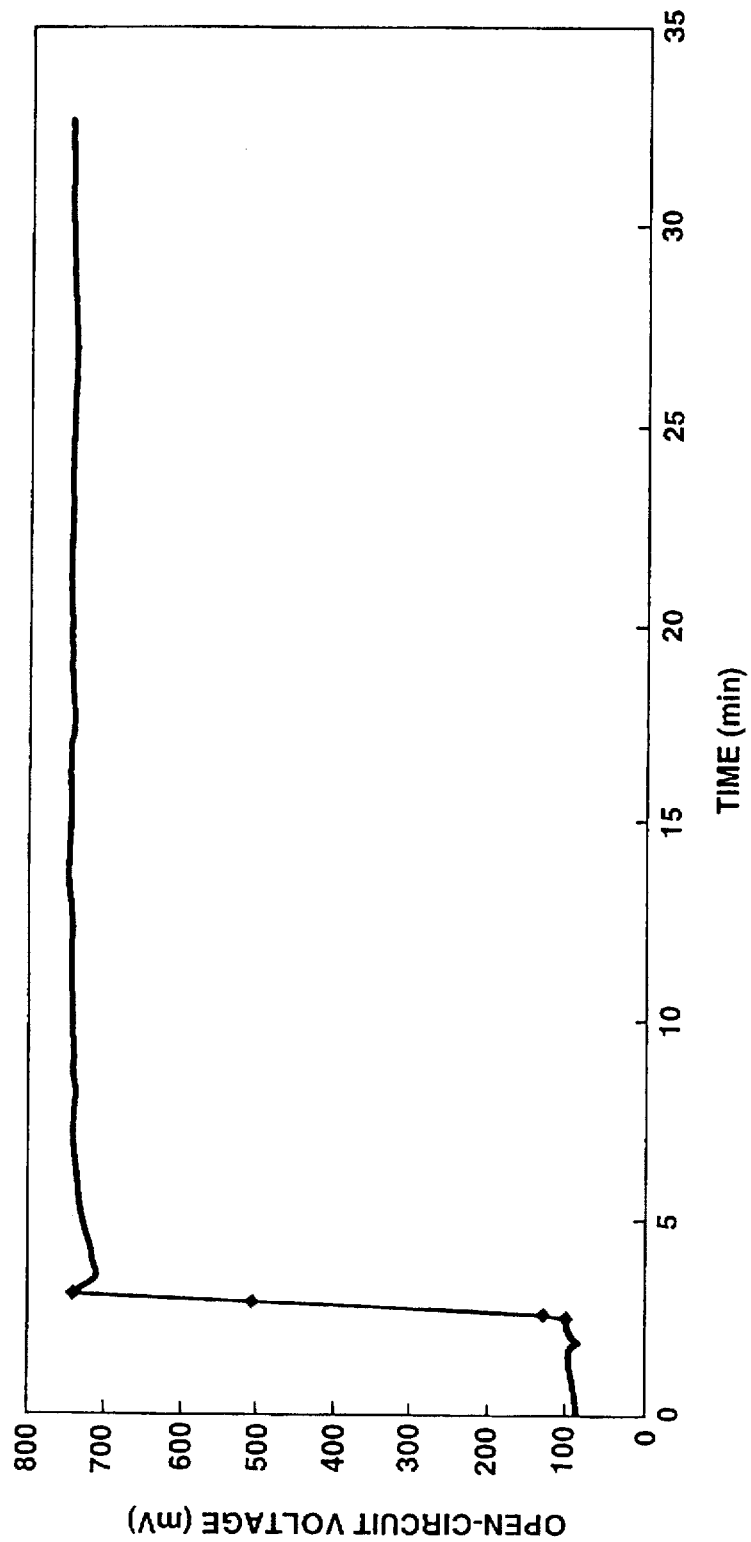
FIG. 3 is a graph showing the change of open-circuit voltage of the fuel cell shown FIG. 2, with the passage of time during the operation of fuel cell.

In the following, there will be described a counter-argument to invalidate the above-mentioned transport model, using FIG. 2. There was conducted a first experiment for the counter-argument. In the first experiment, a fuel cell was prepared by providing a ceria-based electrolyte film 32 having a thickness of 600 82 m between cathode and anode, and further providing a dense yttrium-stabilized zirconia (YSZ) film 34 having a thickness of 10 μm on the cathode side, as shown in FIG. 2. The short-circuit electronic current of the electrolyte film 32 can be suppressed by the provision of the YSZ film 34, due to electronically insulating characteristic (i.e., very low electronic conductivity) of the YSZ film 34. Therefore, according to the transport model, the electronic current should not flow through the electrolyte when the external circuit of fuel cell is open. Furthermore, according to this model, the open-circuit voltage should be the same as a theoretical value of 1.15 V, when a hydrogen gas of atmospheric pressure containing 3% of steam and an oxygen gas of atmospheric pressure are introduced at 800° C. into the fuel cell. However, according to the first experiment's result, the open-circuit voltage of the fuel cell was only 756 mV, which is lowering than the theoretical value of 1.15 V, as shown in FIG. 3. This means that the transport model was invalidated.

NEW ALTERNATIVE MODEL

Figure 4:
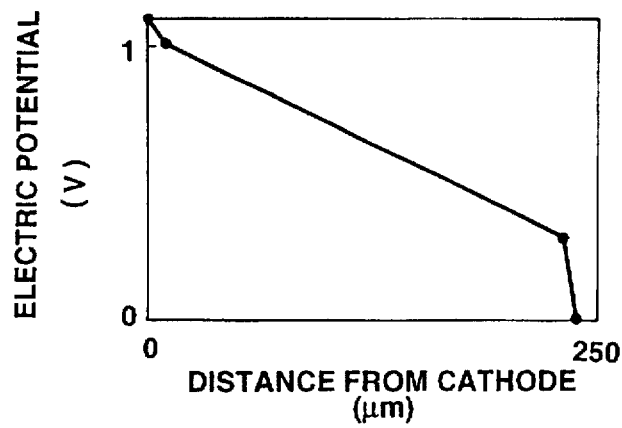
FIGS. 4–6 are graphs respectively showing the changes of electric potentials caused by oxygen ions, by electrons, and by the total of oxygen ions and electrons, according to a new model alternative to the transport model.
Figure 5:
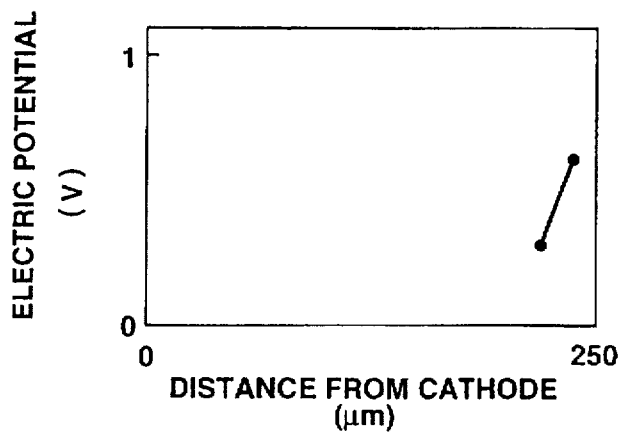
Figure 6:
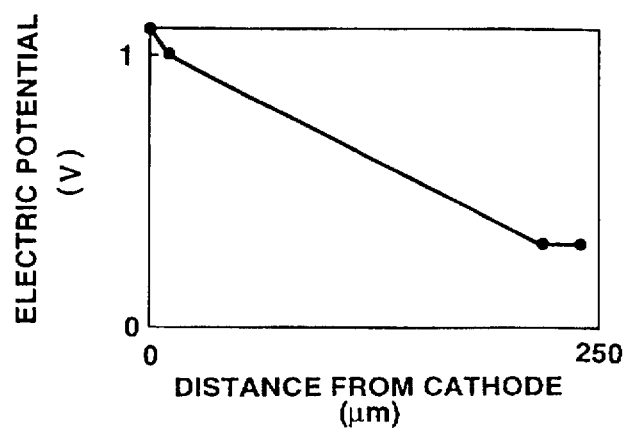
Figure 7:
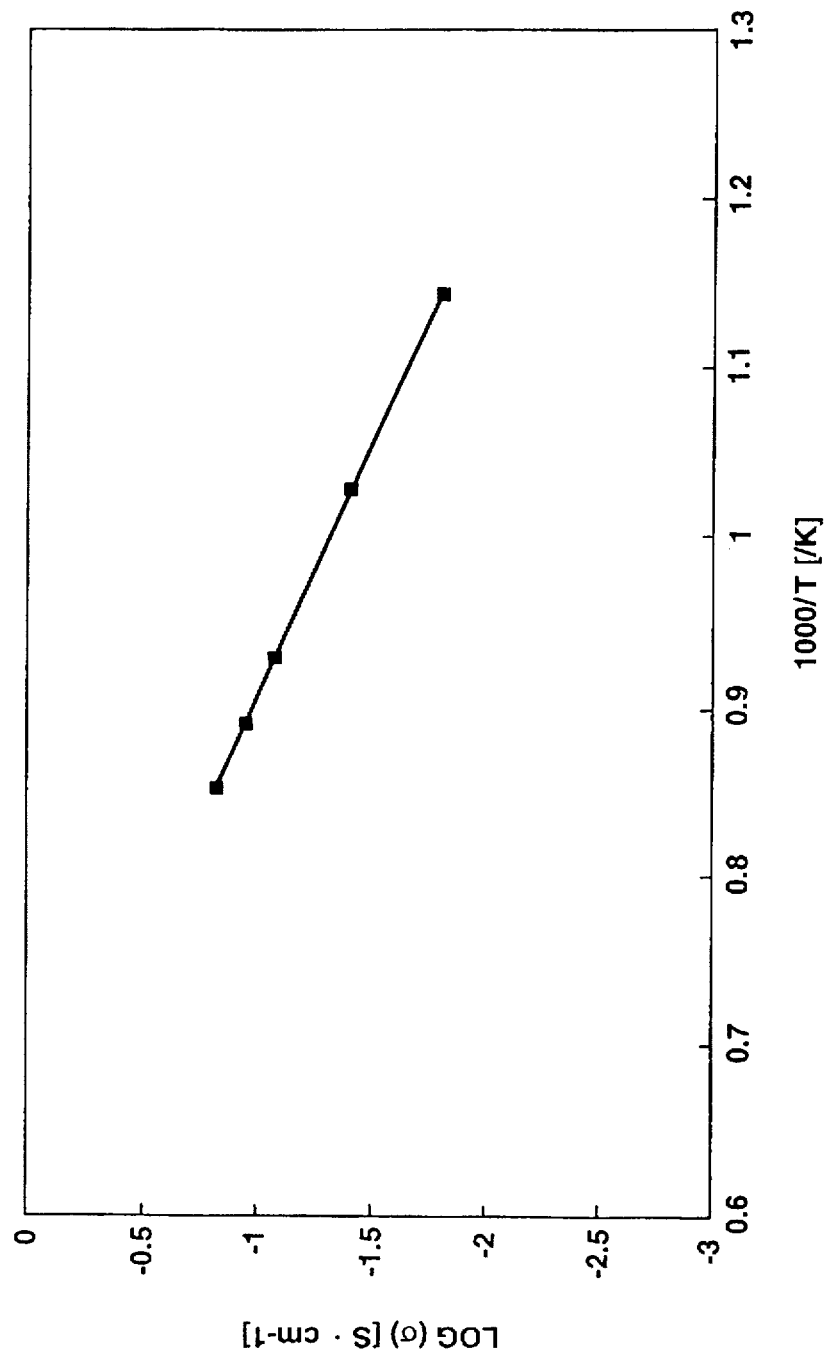
FIG. 7 is a graph obtained by respectively substituting characteristic experimental data of $(CeO_2)_{0.9}(Sm_2O_3)_{0.1}$ for terms of Arrhenius equation.

In the following, we propose a new model that is an alternative to the transport model, for explaining the lowering of the open-circuit voltage of ceria-based electrolyte, in relation to electrostatic field. According to the new model, it is considered that electrons remove the electrostatic field formed by oxygen ions, thereby to lower the open-circuit voltage. In FIGS. 4–6, the electric potential changes within the electrolyte are shown, in accordance with the new model, by the distance from cathode. In fact, the change of electric potential caused by oxygen ions is shown in FIG. 4; that caused by electrons is shown in FIG. 5; and the change of the total electric potential caused by oxygen ions and by electrons is shown in FIG. 6. We assume that the degree of lowering of the open-circuit voltage is likely to depend on the intrinsic characteristic of ceria, which is used as the essential base material of the electrolyte, by the following three facts. The first fact is that the lowering of the open-circuit voltage occurs in vicinity of anode. The second fact is that a constant that does not depend on the electric current is obtained by subtracting RI (R: resistance of ceria, and I: electric current) and the overvoltage from the theoretical open-circuit voltage. The third fact is that the open-circuit voltage changes slightly depending on the condition for preparing the ceria-based electrolyte. Due to the ceria's intrinsic characteristic, a voltage of about 0.34 V is produced. An oxygen ion has an energy of 0.68 eV, because it has a charge of 2e. The amount of this energy is very close to activation energy of oxygen ion. In fact, a ceria-based electrolyte that is made of a material represented by a formula of $(CeO_2)_{0.9}(Sm_2O_3)_{0.1}$ was found to have an activation energy of oxygen ion of 0.68 eV, from the results shown in FIG. 7. In Fig. 7, the Greek letter of σ used in the unit of the axis of ordinates represents electric conductivity. In other words, this activation energy of oxygen ion was obtained by substituting characteristic experimental data of $(CeO_2)_{0.9}(Sm_2O_3)_{0.1}$ for respective terms (parameters) of Arrhenius equation. Thus, we assure that, according to the new alternative model, the real open-circuit voltage is found by the following equation (5).

$$Voc = Vth - E\alpha/2e \tag{5}$$

where Voc is the real open-circuit voltage, Vth is the theoretical open-circuit voltage, Eα is activation energy of oxygen ion in the vicinity of anode of fuel cell, and e is electronic charge. The equation (5) becomes correct, when there is no electronic short-circuit within the electrolyte (i.e, when there is an electronically insulating layer within the electrolyte and a sufficient electronic conductivity within an outer portion of the electrolyte, which is in contact with anode).

Figure 8:
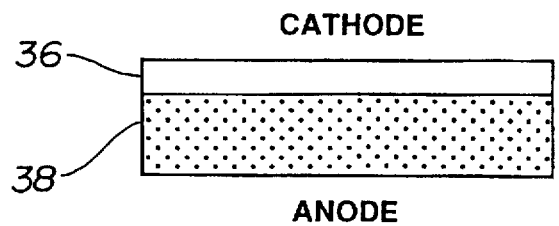
FIG. 8 is a schematic view showing a fuel cell having a YSZ film 36 and an $La_{0.8}Sr_{0.2}MnO_3$ (LSM) film 38, between cathode and anode.
Figure 9:
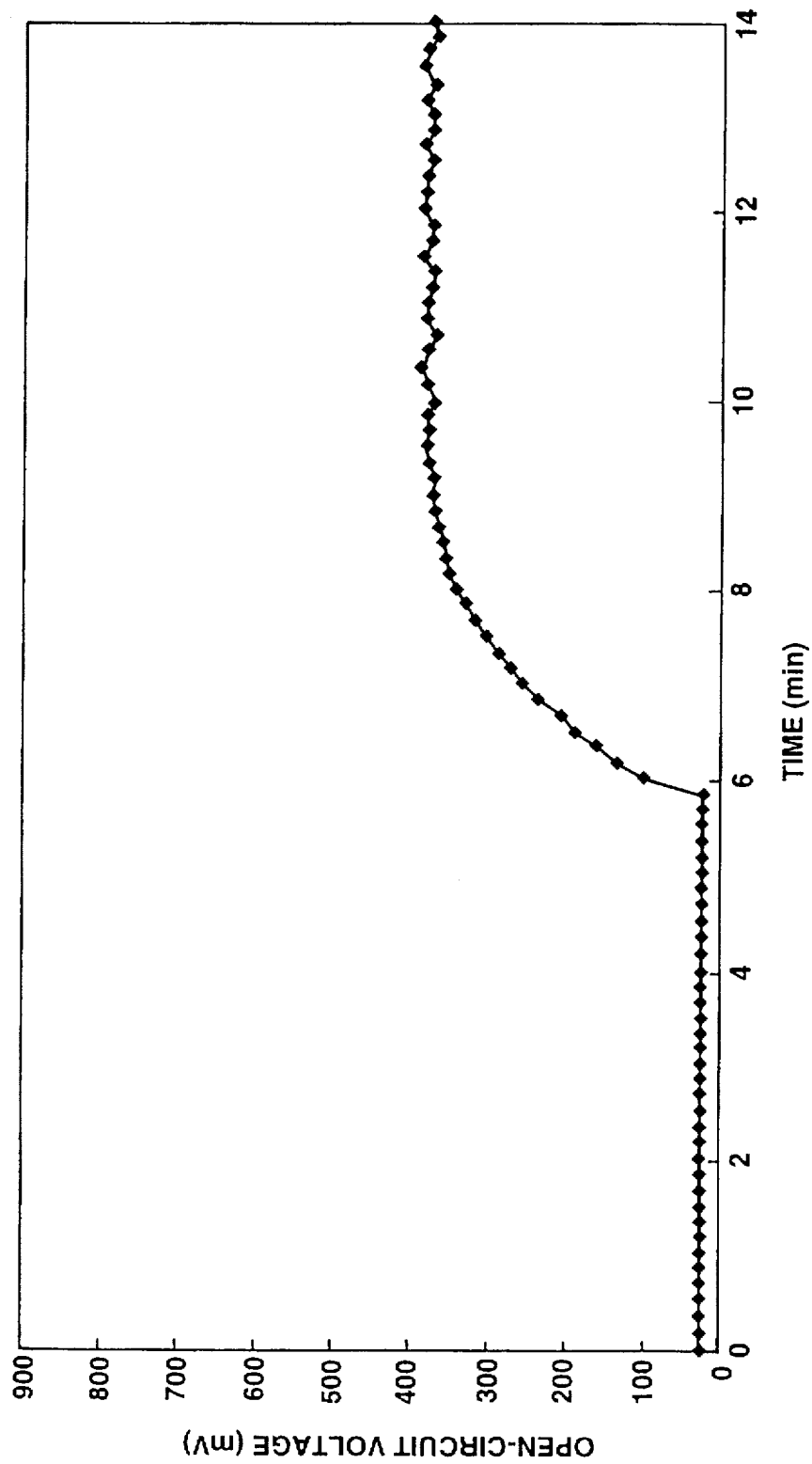
FIG. 9 is a graph showing the change of open-circuit voltage of the fuel cell shown in FIG. 8, with the passage of time during the operation of fuel cell.

In the following, the validity of the above-explained new model (i.e., the equation (5)) will be examined. According to the new model, the rent open-circuit voltage (Voc) depends on the activation energy of oxygen ion of the electrolyte. A second experiment was conducted for validating the new alternative model. In the second experiment, as shown in FIG. 8, a fuel cell was prepared by providing a YSZ film 36 having a thickness of 10 μm and an $La_{0.8}Sr_{0.2}MnO_3$ (hereinafter also referred to LSM) film 38 having a thickness of 600 μ, m between cathode and anode. LSM is oxygen-ion conductive and also electronically conductive, and has a known value of activation energy of oxygen ion ranging from 1.60 to 1.65 eV. In the second experiment, a hydrogen gas (fuel gas) of atmospheric pressure containing 3% of steam and an oxygen gas of atmospheric pressure were respectively introduced at 600° C. to the anode side and the cathode side. The result of the second experiment is shown in FIG. 9. According to FIG. 9, Voc is found to be 0.38 V at 600° C. In contrast, its theoretical open-circuit voltage (Vth) is known to be 1.18 V at 600° C. According to the equation (5), the activation energy of oxygen ion is found to be (1.18−0.38)V·2e=1.60 eV. This value corresponds to the above-mentioned known value (i.e., 1.60–1.65 eV) of activation energy of oxygen ion. Therefore, it was proved that the equation (5) is correct, and thus the new model was validated.

If theoretical examination on the lowering of the open-circuit voltage is further conducted in the future, it may become necessary to replace the equation (5) by the following equation (6).

$$Voc = Vth - E\alpha/2e + \beta \tag{6}$$

where β is a small correction term. In the equation (6), β may be in an amount of ST where S is entropy and T is absolute temperature, as explained in the following. The activation energy obtained from Arrhenius equation is an energy corresponding to enthalpy (H). In contrast, strictly speaking, the energy required for jump to the oxygen vacancy is called the free energy of activation, corresponding to Gibbs free energy (G). Gibbs free energy is found by the following equation (7).

$$G = H - ST \tag{7}$$

In other words, if Eα of the equation (5) is free energy of activation, it is necessary that the equation (5) is replaced by the equation (6) and that β of the equation (6) is in an amount of ST, as mentioned hereinabove. Even if other parameters except ST are pointed out in the future to be included in the term of β of the equation (6), the equation (5) can effectively be used as an approximation. In particular, the equation (5) can be used without any problem, with respect to the amount of activation energy, as follows.

By examining the meaning of the equation (5) using the idea of electrochemical potential, there was obtained a conclusion that, as to a stack of oxygen-ion conductive films that are different in activation energy of oxygen ion, oxygen ions hardly move from one film having a smaller activation energy to another film having a larger activation energy. Herein, electrochemical potential means Gibbs free energy of charged particles (e.g., ions) per mol. Electrochemical potential is different from chemical potential in that the former includes the electric energy contribution. Chemical potential is an extensive variable that indicates the direction of chemical reaction. Chemical reactions proceed to prepare products having lower chemical potentials from reactants having higher chemical potentials. The driving force for the charged particles movement and for chemical reaction depends on the slope of electrochemical potential. Electrochemical potential is found by the following equation (8).

$$\mu EC = \mu C + ZF\Phi \qquad (7)$$

where μEC is electrochemical potential, μC is chemical potential, Z is charge number, F is Faraday constant, and Φ is electric potential. When there is no electric current, there is not produced the electric driving force acting on oxygen ions. Therefore, the electrochemical potential becomes constant.

When oxygen ions leave the electrolyte, the electrostatic potential increases by an amount of the activation energy of oxygen ion, as understood from the equation (5), because oxygen ions are negatively charged and move toward a direction of lower electric potential. In contrast to the electrostatic potential, the chemical potential decreases by an amount of the activation energy of oxygen ion, when they leave the electrolyte. Thus, with respect to a stack of oxygen ion conductive films that are different in activation in energy of oxygen ion, when oxygen ions enter from one film into the next film, the electrostatic potential increases by an amount obtained by subtracting the activation energy of the next film from that of the one film, and in contrast the chemical potential decreases by this amount. When oxygen ions enter from one film having a lower activation energy into the next film having a higher activation energy, the electrostatic potential decreases, and in contrast the chemical potential increases, by the same amount of energy. To conduct a chemical reaction in a direction to increase chemical potential, it is necessary to decrease electrostatic potential by an amount of energy corresponding to that of the chemical potential increase. In this case, it is necessary to increase electric potential at the interface between one film and the next film, because oxygen ions are negatively charged. The direction to increase electric potential is opposite to that of the electromotive force of fuel cell. Thus, the above-mentioned conclusion was obtained.

Almost all of oxygen ion conductive materials are higher in electronic conductivity, as compared with oxygen ion conductivity. Therefore, it is necessary to remove the influence of electronic conductivity, in order to measure the oxygen ion activation energy of the materials (i.e., in order to measure oxygen ion conductivity, while the temperature is changed). The removal of this influence is, however, difficult. Therefore, there are few public measurement data of the activation energy of oxygen ion. In view of this, we have decided to calculate the activation energy of oxygen ion from the open-circuit voltage, using the equation (5). That is, as a solid-electrolyte fuel cell that is mentioned in the following Examples becomes lower in open-circuit voltage, it becomes higher in activation energy of oxygen ion. In order to use the equation (5) in the calculation of activation energy of oxygen ion, an outer surface layer of the electrolyte, where oxygen ions are contacted with fuel (hydrogen) gas, is required to have electronic conductivity. Therefore, according to the present invention, a so-called "bi-conductive (protective) film" that is define as being oxygen ion conductive and also electronically conductive is formed on electrolyte so that the bi-conductive film is sandwiched between electrolyte and anode. In order to avoid short-circuit electronic current, for example, Sm-doped ceria (SDC) film is used as electrolyte. When the SDC film is contacted with hydrogen gas, a surface layer of the SDC film is reduced to have electronic conductivity. However, when the bi-conductive film is formed on the electrolyte as mentioned above, the SDC film is not brought into contact with hydrogen gas. Thus, the SDC film does not become electronically conductive. The open-circuit voltage of SDC is in a range from 0.78 to 0.81 V at 600° C. This voltage somewhat varies depending on the method of preparing SDC, but does not much deviate from this range. In the after-mentioned Examples wherein SDC films were used as electrolyte films, in case that the open-circuit voltage is lower than 0.78 V at 600° C., it is concluded that the bi-conductive film is higher than SDC in activation energy of oxygen ion. In this case, it is expected that the oxygen ion current hardly flows through the electrolyte. In contrast, in case that the open-circuit voltage is higher than 0.80 V at 600° C., it is expected that the oxygen ion current naturally flows therethrough.

In the invention, a film made of a material represented by a formula of $YBa_2Cu_3O_7$ (hereinafter also referred to as YBCO) is preferably used as the bi-conductive film to be formed on the electrolyte film. In the YBCO film, an oxygen ion is transported by the jump from one oxygen vacancy to another oxygen vacancy. Therefore, the distance between one oxygen vacancy and another oxygen vacancy becomes short, and the oxygen vacancies are continuously arranged. With this, YBCO film has a small activation energy of oxygen ion. YBCO is electronically conductive. It is found by the equation (5) that the activation energy of oxygen ion of YBCO is about 0.29 V.

According to the invention, in order to increase the open-circuit voltage, it is preferably to form a bi-conductive film that has an oxygen ion activation energy of less than 0.68 eV and is oxygen ion conductive and electronically conductive, such as a YBCO film, on a ceria-based electrolyte film, so as to be sandwiched between the anode and the electrolyte film. This bi-conductive film is also preferably formed on a YSZ-based electrolyte film, in order to increase the voltage. A reaction as shown in the following reaction formula takes place, in the presence of Ni catalyst, on the anode side of a fuel cell having a YSZ-based electrolyte film.

Figure 15:
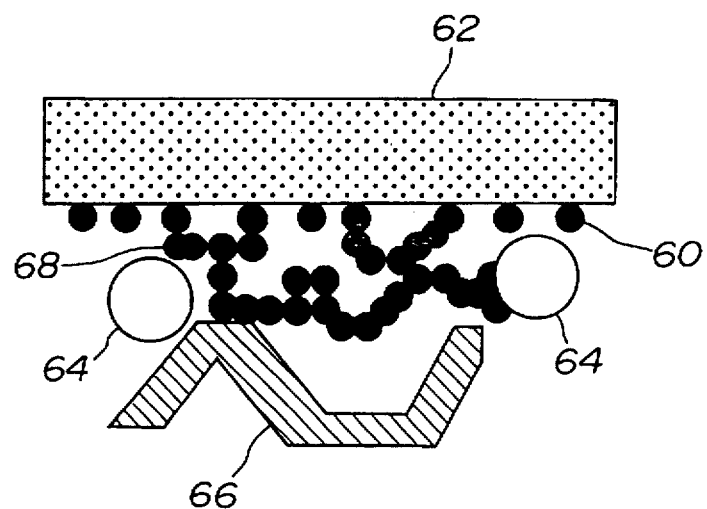
FIG. 15 is an enlarged schematic view showing nickel particles formed on a YSZ-based electrolyte 62.
Figure 16:
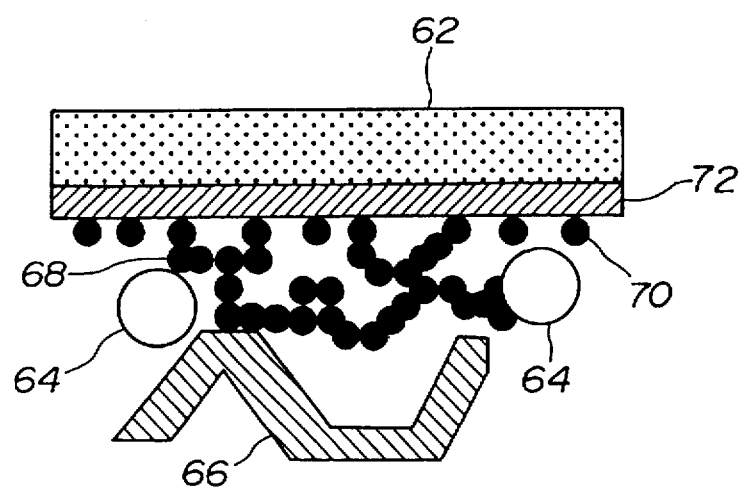
FIG. 16 is an enlarged schematic view showing nickel particles on a bi-conductive film 72.

According to this reaction formula, oxygen ions can not leave the electrolyte, unless they release electrons. In other words, in case of a fuel cell having a YSZ-based electrolyte film, the Ni catalyst formed on the anode just surface does not function properly in this reaction, unless the Ni catalyst is electronically connected with an external circuit. For example, as shown in FIG. 15, denoted by a numeral of 60 is a nickel particle that is not electronically connected with an external circuit. This nickel particle 60 does not function properly in the reaction. In FIGS. 15 and 16, denoted by numerals of 62, 64, 66 and 68 are respectively a YSZ-based electrolyte, YSZ particles, a collector and an aggregate of nickel particles. In contrast to the nickel particle 60 as shown in FIG. 15, a nickel particle 70 that is shown in FIG. 16 is electronically connected with an external circuit by the provision of a bi-conductive film 72. Therefore, the nickel particle 70 functions properly in the reaction. By the provision of the bi-conductive film 72 as shown in FIG. 16, the effective area of anode becomes larger than that of FIG. 15. With this, the lowering of overvoltage is expected. In the invention, the electrolyte film may be made of a bismuth-oxide-based material, too.

In the invention, the bi-conductive film is required to have a small activation energy of oxygen ion as mentioned hereinabove, and it is preferable that this film has a sufficient durability under hydrogen gas at high temperature.

In the invention, it is preferable that the bi-conductive film is made of a material that has been lowered in ion activation energy by changing the crystal structure of a base material (e.g., $ZrO_2$ and $CeO_2$) that is oxygen ion conductive and is resistant to reducing atmosphere. The crystal structure can be changed by changing dopants to be added to the base material.

Figure 17:
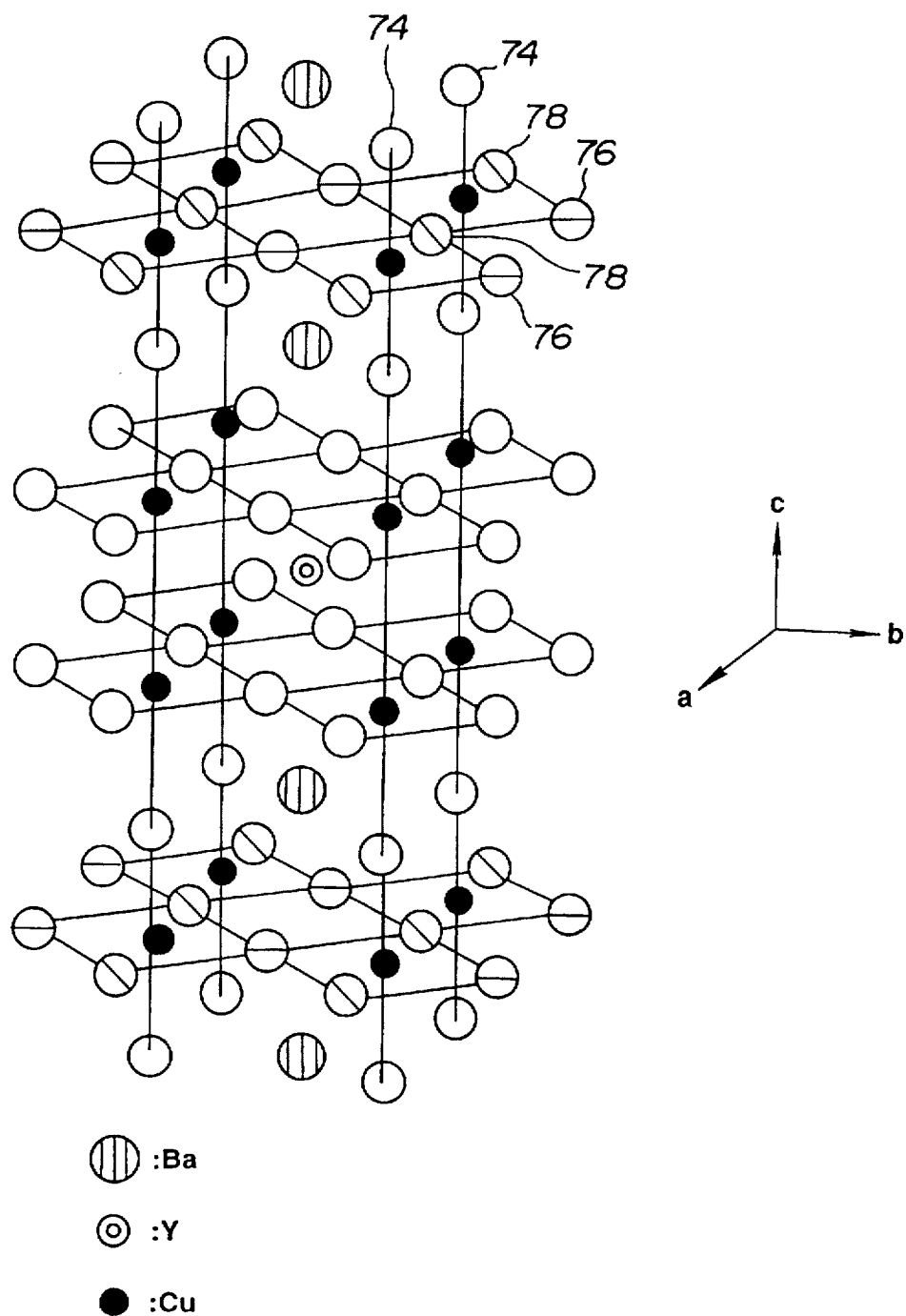
FIG. 17 is a view showing an exemplary three-dimensional structure of $YBa_2Cu_3O_7$ (YBCO)

Ion activation energy depends considerably on the crystal structure. For example, $ZrO_2$, $CeO_2$ and $Bi_2O_3$ are oxygen ion conductive and have a fluorite crystal structure and activation energies ranging from about 0.7 to about 1 eV. In contrast to these oxides, YBCO has a perovskite crystal structure having oxygen ion vacancies and has a small activation energy of about 0.3 eV. The structure of YBCO is characterized in that the concentration of oxygen ion vacancies is high and thus the distance between two oxygen-ion vacancies is short. YBCO has an exemplary structure that is shown in FIG. 17. In FIG. 17, denoted by a numeral of 74 are oxygen atoms having an occupancy coefficient of 1, and denoted by numerals of 76 and 78 are oxygen atoms having occupancy coefficients less than 1.

Figure 18:
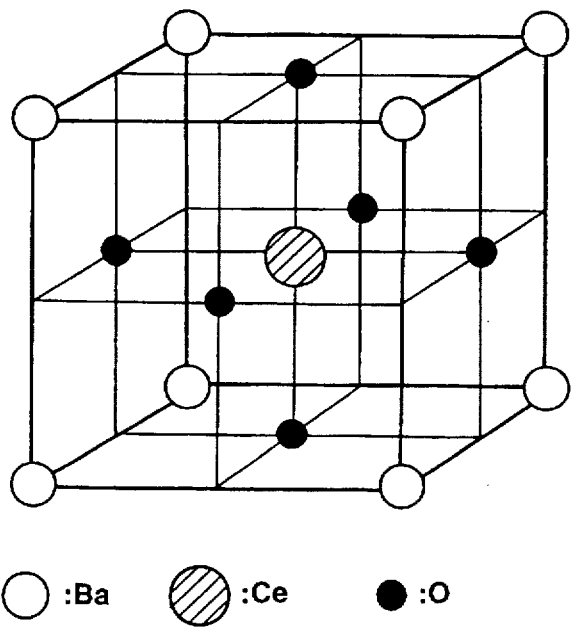
FIG. 18 is a view showing a perovskite structure.
Figure 19:
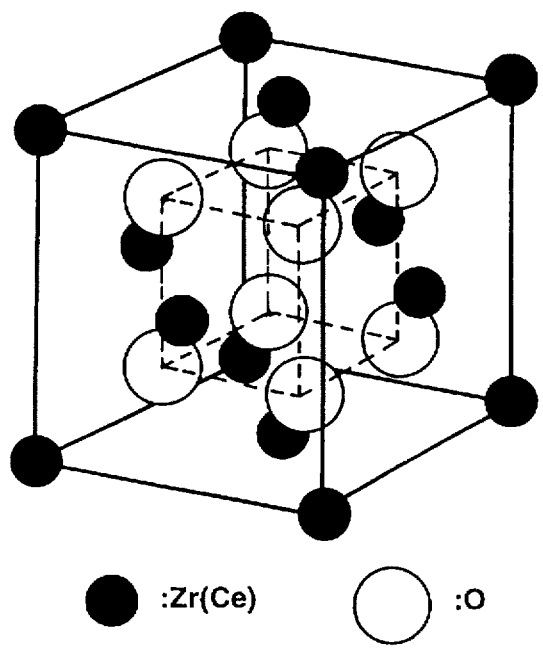
FIG. 19 is a view showing a fluorite structure.

The above-mentioned perovskite structure belongs to cubic crystal system and is represented by a formula of $ABO_3$. This structure is shown in FIG. 18. Examples of compounds that have perovskite structure and are oxygen ion conductive are $CaZrO_3$, $SrZrO_3$, $BaZrO_3$, $CaCeO_3$, $SrCeO_3$ and $BaCeO_3$. Many of these compounds have somewhat distorted structures. The above-mentioned fluorite structure also belongs to cubic crystal system and is represented by a formula of $AO_2$, such as $ZrO_2$ and $CeO_2$, where A is an ion having a valence of +4. This structure is shown in FIG. 19. In order to increase the fluorite structure in oxygen ion conductivity, "A" is often partially replaced by a bivalent or trivalent cation (e.g., $Mg^{2+}$, $Ca^{2+}$, $Ba^{2+}$, $Sr^{2+}$, $Y^{3+}$, $Gd^{3+}$, $Nd^{3+}$, $Sc^{3+}$ and $Sm^{3+}$).

The reason of the generation of oxygen ion vacancies will be explained in the following. The concentration of oxygen ion vacancies depends on the type of dopant. For example, when $CeO_2$ used as a base material of electrolyte is doped with a suitable amount of rare-earth oxide of $Sm_2O_3$, one oxygen ion vacancy is generated in $CeO_2$ per two $Sm^{3+}$ ions, due to the correction of electric potential. However, if the amount of dopant is too much, $Sm^{3+}$ ions are associated with each other. With this, the crystal structure will be broken.

An oxide of $BaCe_{0.8}Y_{0.2}O_{3-x}$ is known to have a stable perovskite crystal structure having oxygen vacancies and have an activation energy of 0.3 eV. This oxide can be prepared by doping a perovskite structure compound with an ion having a valence of +3 or by doping a fluorite-structure compound with an ion having a valence of +2.

In the invention, a bi-conductive film is prepared, for example, from a mixture of about 0.8 parts by mol of at least one base compound such as $ZrO_2$ and $CeO_2$, about 1 part by mol of at least one compound having a valence of +2 such as MgO, CaO, $Sr(CH_3COO)_2$ and $BaCO_3$, about 0.1 parts by mol of at least one compound having a valence of +3 such as $Y_2O_3$, $Nd_2O_3$, $Gd_2O_3$, $Sc_2O_3$ and $Sm_2O_3$.

The following nonlimitative examples are illustrative of the present invention.

EXAMPLE 1

Figure 10:
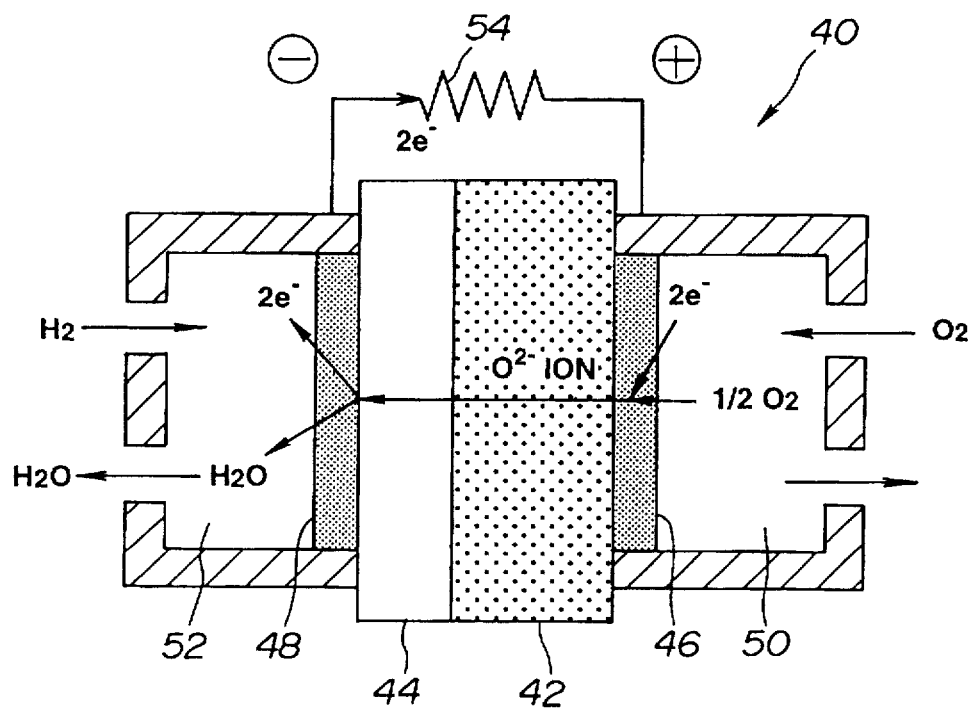
FIG. 10 is a schematic view showing the operation of a fuel cell according to the present invention.

In this example, a fuel cell 40 according to the present invention as shown in FIG. 10 was prepared as follows. A solid electrolyte film 42 of the fuel cell 40 having a thickness of 600 µm and a diameter of 25 mm was made of a material of Sm-doped $CeO_2$, which is represented by a formula of $(CeO_2)_x (Sm_2O_3)_{1-x}$ where x is a real number that is greater than 0 and less than 1. After the preparation of the electrolyte film 42, a bi-conductive film 44 having a thickness of 400 µm and a diameter of 25 mm was directly formed on the electrolyte film 42, by a heat treatment in an atmosphere of 900° C. for 1 hr. This bi-conductive film 44 that is oxygen-ion conductive and electronically conductive was made of $YBa_2Cu_3O_7$ (hereinafter also referred to as YBCO) which is called triple-defects perovskite. As is seen from FIG. 10, a cathode 46 and an anode 48, both of which are made of platinum were formed. Furthermore, an oxygen gas supply chamber 50, fuel (hydrogen) gas supply chamber 52 were formed, and a load 54 was connected to the anode 46 and the cathode 48, as shown in FIG. 10.

Figure 11:
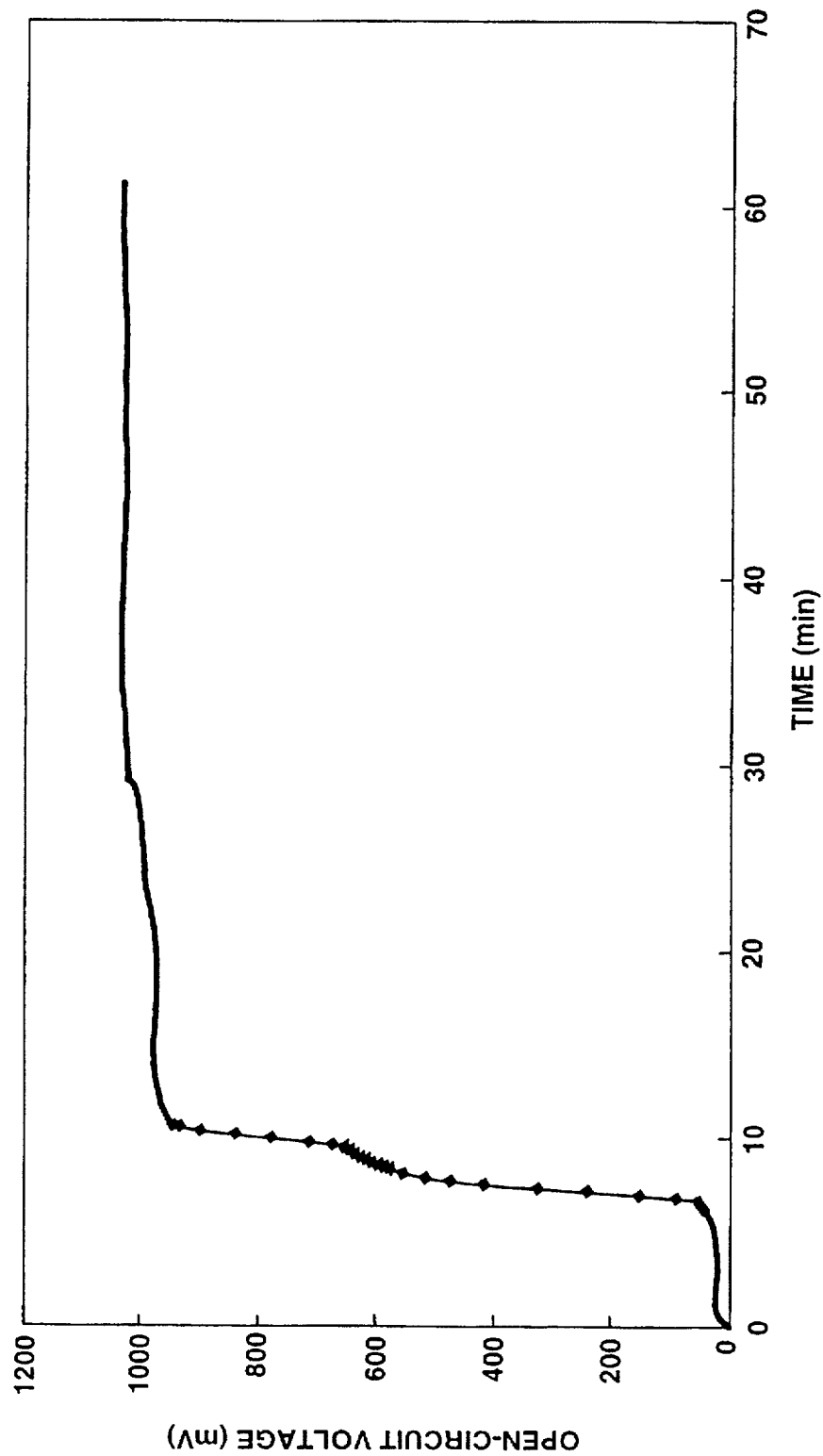
FIG. 11 is a graph similar to FIG. 3, but showing the change of open-circuit voltage of the after-mentioned Example 1.

Then, the fuel cell 40 was operated at 600° C. by respectively introducing a hydrogen gas (fuel gas) of atmospheric pressure containing 3% of steam and an oxygen gas of atmospheric pressure into the fuel gas supply chamber 52 and the oxygen supply chamber 50 in order to determine the open-circuit voltage. The result is shown in FIG. 11. As shown in FIG. 11, the open-circuit voltage increased to a constant value of 1.035 V with the passage of time during the operation of fuel cell.

EXAMPLE 2

Figure 12:
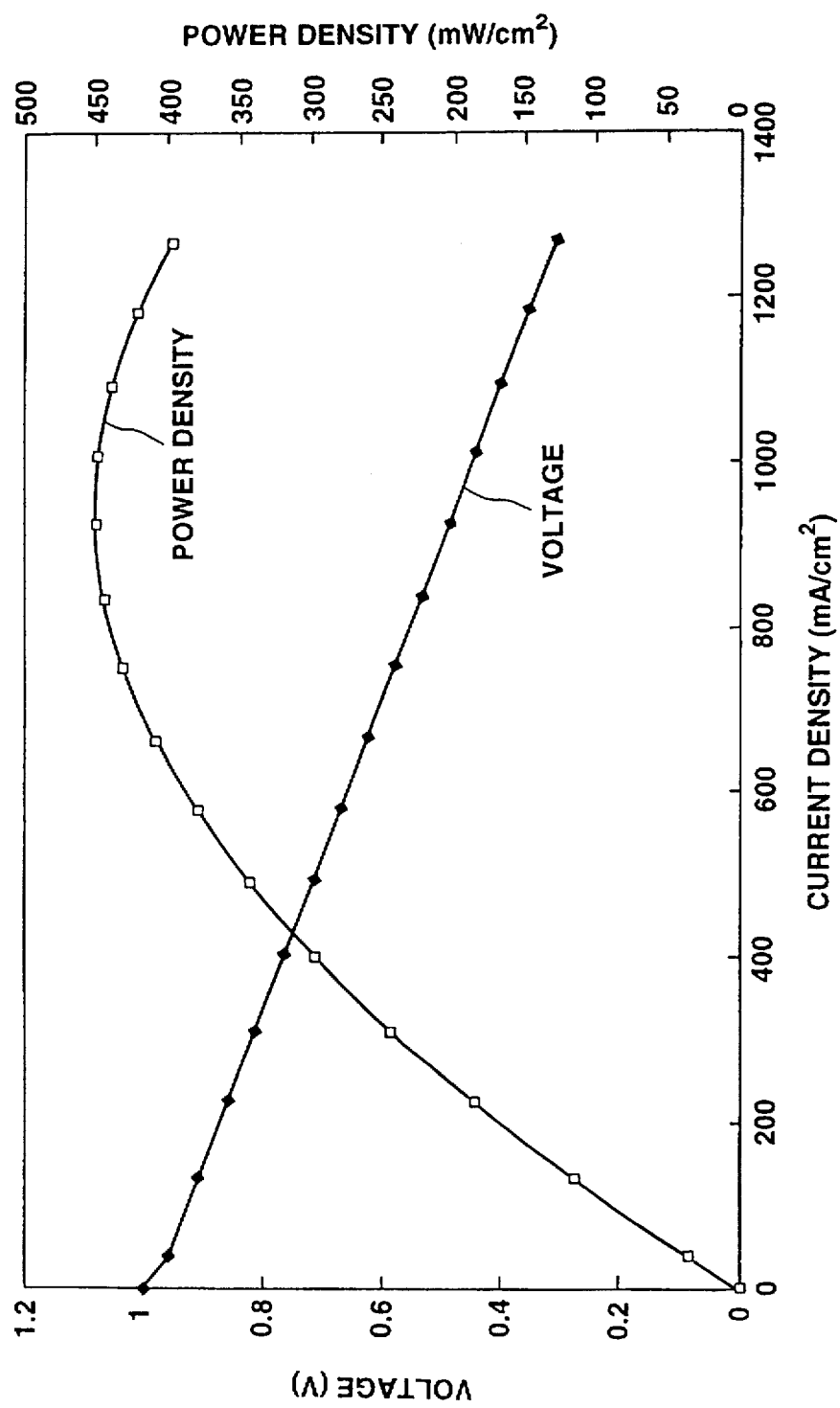
FIG. 12 is a graph showing power generation characteristics at 800° C. of a fuel cell according to the after-mentioned Example 2.
Figure 13:
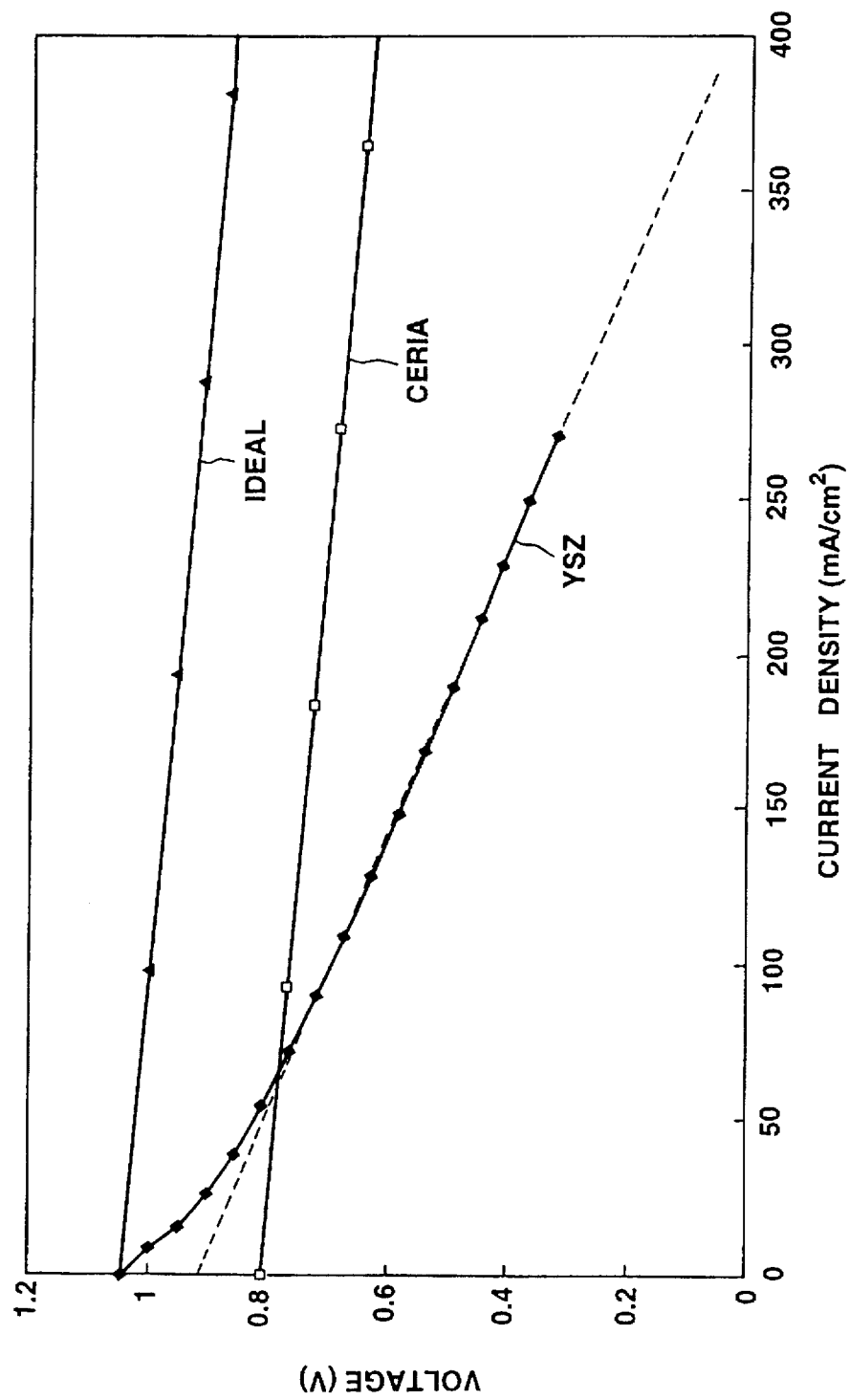
FIGS. 13 and 14 are graphs similar to FIG. 12, but showing power generation characteristics at 800° C. with respect to the ideal fuel cell, to a conventional fuel cell having ceria-based electrolyte, and to a conventional fuel cell having YSZ-based electrolyte, respectively.
Figure 14:
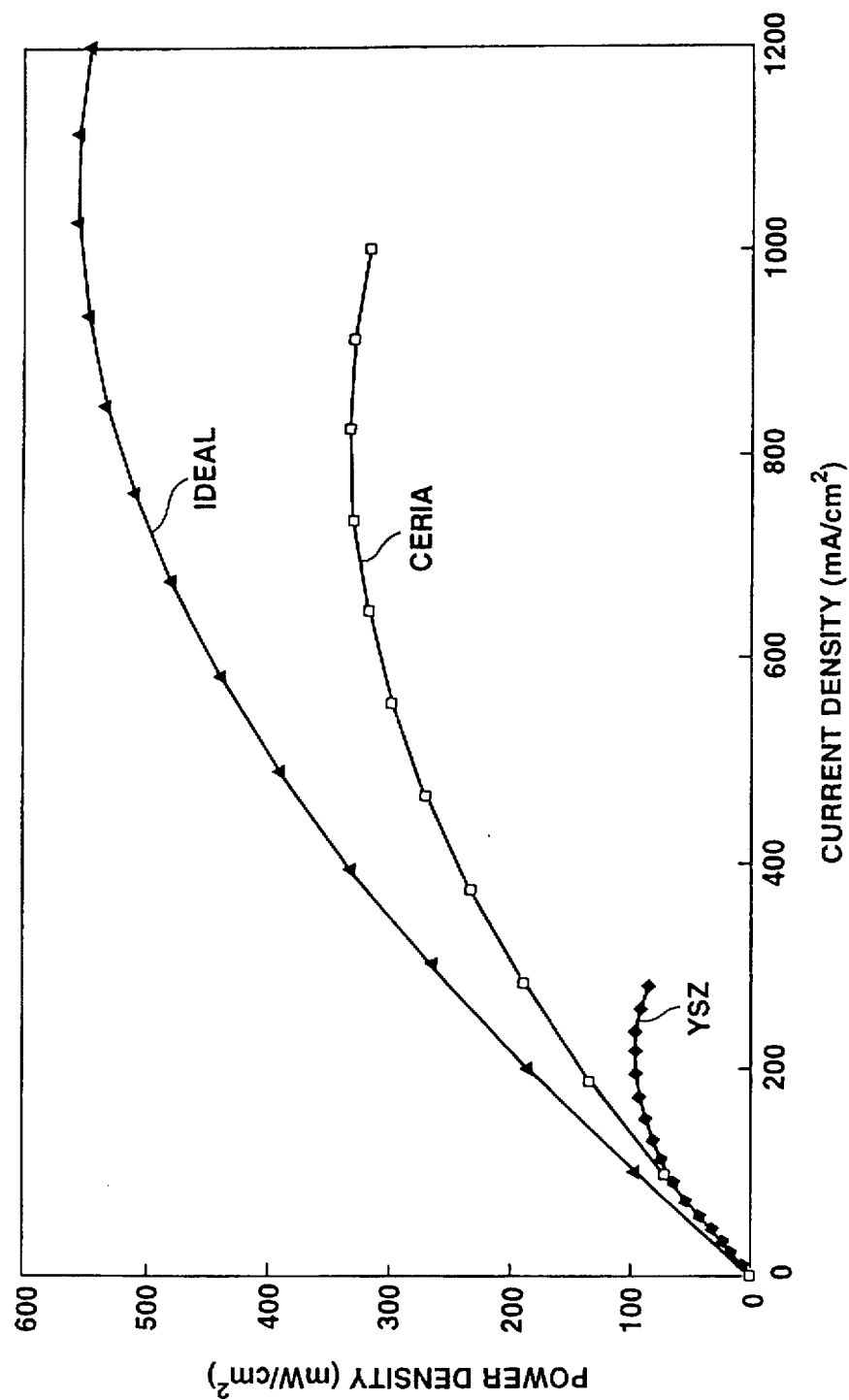

In this example, Example 1 was repeated except in that the thickness the solid electrolyte film 42 was changed to 400 µm, that the thickness of the bi-conductive film 44 was changed to 30 µm, and that the fuel cell 40 was operated at 800° C. to measure the power generation characteristics of the fuel cell 40. The results of this measurement are shown in FIG. 12, with respect to the relationship between power density and current density and to the relationship between voltage and current density. It is understood that the results of these relationships at 800° C. which are shown in FIG. 12 are respectively similar to the ideal relationships at 800° C. which are shown in FIGS. 13 and 14. In FIGS. 13 and 14, the relationships with respect to a conventional ceria-based electrolyte and a conventional YSZ-based electrolyte are shown, together with the ideal relationships.

EXAMPLE 3

In this example, a bi-conductive film to be formed on an electrolyte film of fuel cell was prepared as follows. At first, a mixture was prepared by mixing 0.8 parts by mol of a first base compound selected from the group consisting of $ZrO_2$ and $CeO_2$, 1 part by mol of a second compound containing bivalent (+2) element that is selected from the group consisting of MgO, CaO, $Sr(CH_3COO)_2$ and $BaCO_3$, and 0.1 parts by mol of a third compound containing trivalent (+3) element that is selected from the group consisting $Y_2O_3$, $Nd_2O_3$, $Gd_2O_3$, $Sc_2O_3$ and $Sm_2O_3$. The thus prepared mixture was subjected to a preliminary sintering. The thus obtained sintered body was molded by pressing under a pressure of 1 metric ton per cm² to prepare a molded body. This molded body was sintered at 1,300° C. for 10 hr. The thus obtained sintered body had a diameter of 25 mm and was ground to have a thickness of 1 mm, thereby preparing the bi-conductive film.

The thus obtained bi-conductive film was stuck on a solid electrolyte film that has a thickness of 1 mm and a diameter of 25 mm and is made of $CeO_2$ doped with $Sm_2O_3$.

Using the thus prepared stack of the bi-conductive film and the electrolyte film, a fuel cell was prepared as shown in FIG. 10. This fuel cell was operated at 600° C. by respectively introducing an oxygen gas and a hydrogen gas containing 3% of steam into cathode and anode. The cathode and anode were made of porous platinum. Each terminal had an area of 0.785 cm² and a diameter of 10 mm. During the operation of fuel cell, the voltage between cathode and anode was measured, when the circuit was open. The results are shown in Table. As shown in Table, for example, a fuel cell having Sample No. 1 was prepared by using a bi-conductive film made of a mixture of $ZrO_2$, MgO and $Y_2O_3$. Another fuel cell having Sample No. 2 was prepared by using a bi-conductive film made of mixture of $ZrO_2$, MgO and $Nd_2O_3$. Similarly, other fuel cells were prepared by using bi-conductive films having cationic compositions as shown in Table.

The voltage between cathode and anode of a fuel cell in which a bi-conductive film according to the present invention is omitted is usually within a range from 0.76 to 0.80 V. In comparison with this range, it is understood from the results of Table that all the Sample Nos. 1–40 showed higher open-circuit voltages.

TABLE

| Sample Nos. | Cationic Types of Bi-conductive film | Open-circuit Voltage (V) |
| --- | --- | --- |
| 1 | Zr, Mg and Y | 0.95 |
| 2 | Zr, Mg and Nd | 1.05 |
| 3 | Zr, Mg and Gd | 1.08 |
| 4 | Zr, Mg and Sc | 0.89 |
| 5 | Zr, Mg and Sm | 1.09 |
| 6 | Zr, Ca and Y | 1.10 |
| 7 | Zr, Ca and Nd | 1.12 |
| 8 | Zr, Ca and Gd | 1.10 |
| 9 | Zr, Ca and Sc | 1.10 |
| 10 | Zr, Ca and Sm | 1.10 |
| 11 | Zr, Sr and Y | 1.10 |
| 12 | Zr, Sr and Nd | 1.12 |
| 13 | Zr, Sr and Gd | 1.13 |
| 14 | Zr, Sr and Sc | 1.10 |
| 15 | Zr, Sr and Sm | 1.02 |
| 16 | Zr, Ba and Y | 1.10 |
| 17 | Zr, Ba and Nd | 1.01 |
| 18 | Zr, Ba and Gd | 1.01 |
| 19 | Zr, Ba and Sc | 1.10 |
| 20 | Zr, Ba and Sm | 1.12 |
| 21 | Ce, Mg and Y | 0.90 |
| 22 | Ce, Mg and Nd | 0.88 |
| 23 | Ce, Mg and Gd | 0.85 |
| 24 | Ce, Mg and Sc | 0.86 |
| 25 | Ce, Mg and Sm | 0.90 |
| 26 | Ce, Ca and Y | 0.97 |
| 27 | Ce, Ca and Nd | 0.95 |
| 28 | Ce, Ca and Gd | 0.95 |
| 29 | Ce, Ca and Sc | 0.95 |
| 30 | Ce, Ca and Sm | 0.98 |
| 31 | Ce, Sr and Y | 1.05 |
| 32 | Ce, Sr and Nd | 1.02 |
| 33 | Ce, Sr and Gd | 1.05 |
| 34 | Ce, Sr and Sc | 1.06 |
| 35 | Ce, Sr and Sm | 1.07 |
| 36 | Ce, Ba and Y | 1.11 |
| 37 | Ce, Ba and Nd | 1.10 |

TABLE-continued

| Sample Nos. | Cationic Types of Bi-conductive film | Open-circuit Voltage (V) |
| --- | --- | --- |
| 38 | Ce, Ba and Gd | 1.10 |
| 39 | Ce, Ba and Sc | 1.10 |
| 40 | Ce, Ba and Sm | 1.11 |

EXAMPLE 4

In this example, a bi-conductive film was formed on a solid electrolyte film that has a diameter of 20 mm and is made of $CeO_2$ doped with $Sm_2O_3$, by the following method. At first, the electrolyte film was coated with a powder of $BaCO_3$. The thus coated electrolyte film was subjected to a heat treatment at 1,000° C. for 5 hr. The thus heated electrolyte film was found to have a surface layer that has a perovskite and oxygen vacancies and is made of $Ba_xCe_{1-x-y}Sm_yO_z$, by the observation with a electron microscope and by the identification using XRD. Thus, this surface layer serves as a bi-conductive layer. It is believed that the surface layer was formed by the diffusion of Ba into the electrolyte's interior.

Then, a first fuel cell was prepared in a manner similar to that of Example 3, using the electrolyte film having the bi-conductive layer. Similar to Example 3, the open-circuit voltage of the first fuel cell was measured and found to be 1.09 V. Then, second and third fuel cells were respectively prepared in the same manner as that of the first fuel cell, by using $Sr(CH_3COO)_2$ and CaO, in place of $BaCO_3$. The open-circuit voltages of the second and third fuel cells were measured and found to be 0.98 V and 0.95 V, respectively.

EXAMPLE 5

Figure 20:
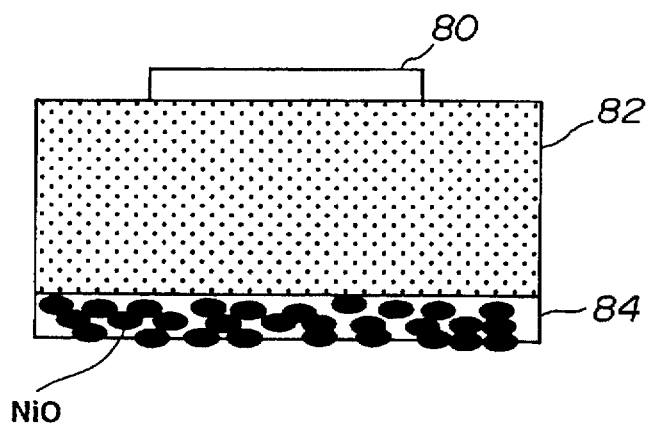
FIG. 20 is a schematic view showing a fuel cell having a bi-conductive film 84 containing NiO particles, according to the after-mentioned Example 5.
Figure 21:
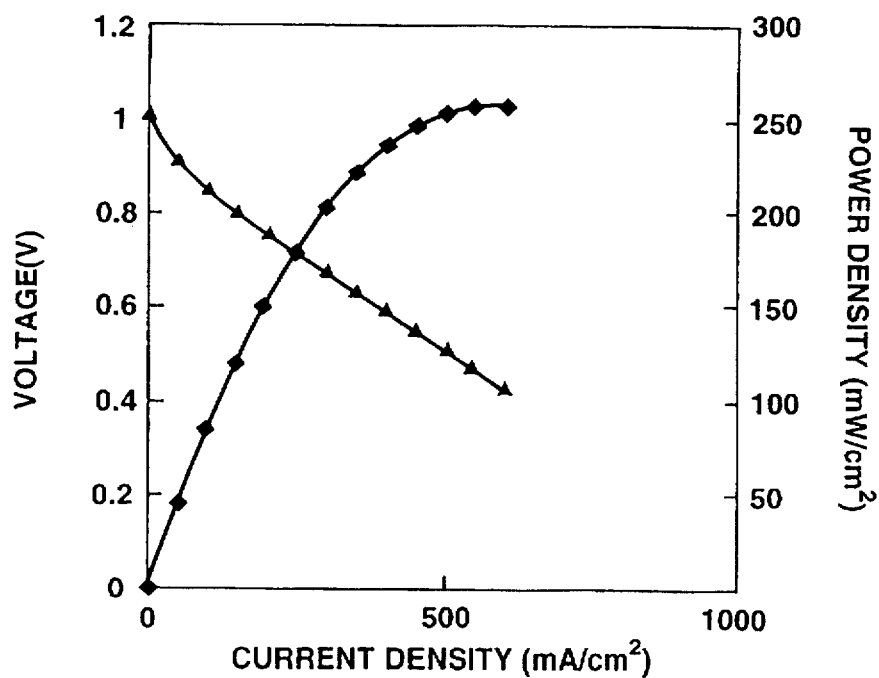
FIG. 21 is a graph similar to FIG. 12, but showing power generation characteristics of a fuel cell according to Example 5.
Figure 22:
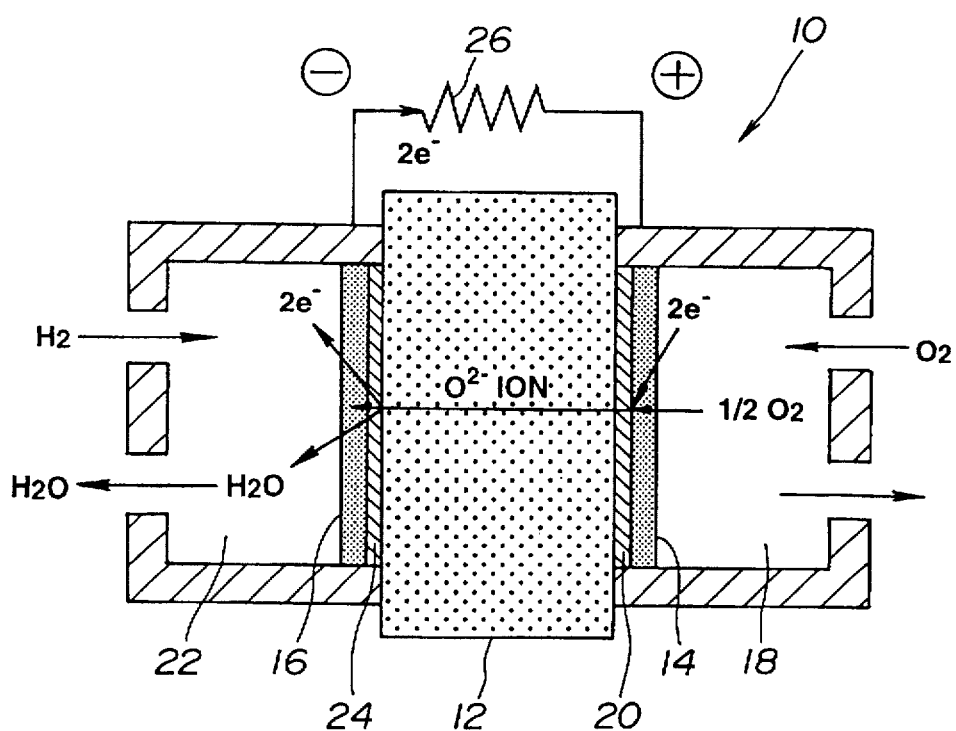
FIG. 22 is a schematic view showing the operation of a conventional fuel cell.

In this example, a bi-conductive film was formed on a solid electrolyte film having a thickness of 1 mm and a diameter of 25 mm. At first, a first mixture was prepared by mixing together 0.8 parts by mol of $CeO_2$, 1 part by mol of $BaCO_3$ and 0.1 parts by mol of $Sm_2O_3$. Then, the first mixture was mixed with 40 wt% of a powder of NiO, based on the total weight of the first mixture, thereby to prepare a second mixture. The electrolyte film was coated with the second mixture, followed by a sintering at 1,300° C. for 10 hr. With this, a bi-conductive film was formed on the electrolyte film. Using a stack of the bi-conductive film and the electrolyte film, a fuel cell as shown in FIG. 20 was prepared. In FIG. 20, denoted by numerals of 80, 82 and 84 are a cathode, an electrolyte film and bi-conductive film, respectively. It is believed that NiO contained in the bi-conductive film is reduced to Ni in hydrogen gas atmosphere during the operation of fuel cell. This Ni serves as a catalyst in a reaction shown in the above-mentioned equation (2). Therefore, the bi-conductive film is believed to serve as anode, too. The fuel cell's characteristics were analyzed, and the results are shown in FIG. 21. It is understood from these results that the bi-conductive film served as anode, too.

What is claimed is:

1. A solid-electrolyte fuel cell comprising:

an anode adapted for contact with a fuel;

a cathode adapted for contact with an oxidant for oxidizing said fuel; and first and second oxygen-ion-conductive films that are in direct contact with each other, are connected with said anode and said cathode, and are arranged in descending order toward said anode, by activation energy of oxygen ion.

2. A solid-electrolyte fuel cell according to claim 1, wherein said first film is in contact with said cathode and is low in electronic conductivity whereby a short-circuit electronic current is prevented therein.

3. A solid electrolyte fuel cell according to claim 2, wherein said first film is made of a first material containing as an essential component $CeO_2$.

4. A solid-electrolyte fuel cell according to claim 3, wherein said first material is doped with a rare-earth oxide of a trivalent rare-earth element.

5. A solid-electrolyte fuel cell according to claim 4, wherein said rare-earth oxide is samarium oxide.

6. A solid-electrolyte fuel cell according to claim 1, wherein said second film is in contact with said anode and is made of a second material that is electronically conductive.

7. A solid-electrolyte fuel cell according to claim 6, wherein said second material has a crystal structure represented by a formula of $YBa_2Cu_3O_7$, said crystal structure having oxygen vacancy defects that are continuously arranged.

8. A solid-electrolyte fuel cell comprising:
   an anode adapted for contact with a fuel;
   a cathode adapted for contact with an oxidant for oxidizing said fuel;
   at least one electrolyte film that is oxygen ion conductive and is made of a first material containing as an essential component $CeO_2$; and
   at least one oxygen-ion-conductive film, said at least one electrolyte film and said at least one oxygen-ion-conductive film being stuck together, being connected with said anode and said cathode, and being arranged in descending order toward said anode, by activation energy of oxygen ion.

9. A solid-electrolyte fuel cell according to claim 8, wherein said at least one oxygen-ion-conductive film is made of a second material having a crystal structure represented by a formula of $YBa_2Cu_3O_7$, said crystal structure having oxygen vacancy defects that are continuously arranged.

10. A solid-electrolyte fuel cell according to claim 8, wherein said first material is doped with samarium oxide.

11. A solid electrolyte fuel cell comprising:
    an anode adapted for contact with a fuel;
    cathode adapted for contact with an oxidant for oxidizing said fuel;
    a first electrolyte film that is oxygen-ion conductive and is interposed between and connected with said anode and said cathode; and
    a second film that is interposed between and connected with said first electrolyte film and said anode, is electronically conductive and oxygen-ion conductive, and has an activation energy of oxygen ion of not greater than 0.68 eV.

12. A solid-electrolyte fuel cell according to claim 11, wherein said first electrolyte film is made of a first material containing as an essential component $CeO_2$.

13. A solid-electrolyte fuel cell according to claim 11, wherein said second film is made of a second material which contains Cu and has a perovskite structure and oxygen vacancy defects such that said second film is made oxygen-ion conductive.

14. A solid-electrolyte fuel cell according to claim 13, wherein said second material has a crystal structure represented by a formula of $YBa_2Cu_3O_7$, said crystal structure having oxygen vacancy defects that are continuously arranged.

15. A solid-electrolyte fuel cell according to claim 11, wherein said anode has a catalyst formed thereon for an oxidation of said fuel by said oxidant.

16. A solid-electrolyte fuel cell according to claim 15, wherein said catalyst contains nickel.

17. A solid-electrolyte fuel cell according to claim 11, wherein said second film has an activation energy of oxygen ion of not greater than 0.5 eV.

18. A solid-electrolyte fuel cell comprising:
    an anode adapted for contact with a fuel;
    a cathode adapted for contact with an oxidant for oxidizing said fuel;
    a first electrolyte film that is oxygen-ion conductive and is interposed between and connected with said anode and said cathode; and
    a second oxide film which is interposed between and connected with said first electrolyte film and said anode, contains at least one of $CeO_2$ and $ZrO_2$, and has a perovskite structure having oxygen vacancy defects such that said second oxide film is made oxygen-ion conductive.

19. A solid-electrolyte fuel cell according to claim 18, wherein said first electrolyte film is made of a first material containing as an essential component $CeO_2$.

20. A solid-electrolyte fuel cell according to claim 18, wherein said second oxide film is doped with a rare-earth oxide of a trivalent rare-earth element.

21. A solid-electrolyte fuel cell according to claim 20, wherein said rare-earth oxide is at least one first member selected from the group consisting of $Y_2O_3$, $Gd_2O_3$, $Nd_2O_3$, $Sc_2O_3$, and $Sm_2O_3$.

22. A solid-electrolyte fuel cell according to claim 18, wherein said second oxide film contains at least one selected from the group consisting of Ba, Sr, Ca, and Mg.

23. A solid-electrolyte fuel cell according to claim 21, wherein said second oxide film contains about 0.1 parts by mol of said at least one first member, about 0.8 parts by mol of at least one second member selected from the group consisting of $CeO_2$ and $ZrO_2$, and about 1 part by mol of at least one third member selected from the group consisting of BaO, SrO, CaO and MgO.

24. A solid-electrolyte fuel cell according to claim 18, wherein said second oxide film is mixed with at least one of a Ni powder and a powder which is adapted for reduction in a hydrogen gas atmosphere to generate Ni.

25. A solid-electrolyte fuel cell comprising:
    an anode adapted for contact with a fuel;
    a cathode adapted for contact with an oxidant for oxidizing said fuel;
    a first electrolyte film that is oxygen-ion conductive, is interposed between and connected with said anode and said cathode, and is made of a first material containing as an essential component $CeO_2$; and
    a second oxide film which is interposed between and connected with said first electrolyte film and said anode, and has a perovskite structure having oxygen vacancy defects such that said second oxide film is made oxygen-ion conductive, said second oxide film being prepared by diffusing at least one member selected from the group consisting of Ba, Sr, and Ca, into a surface layer of said first electrolyte film.

* * * * *